No. 757,598. PATENTED APR. 19, 1904.
G. H. CARLIN.
DRIVING REINS.
APPLICATION FILED DEC. 19, 1903.
NO MODEL.
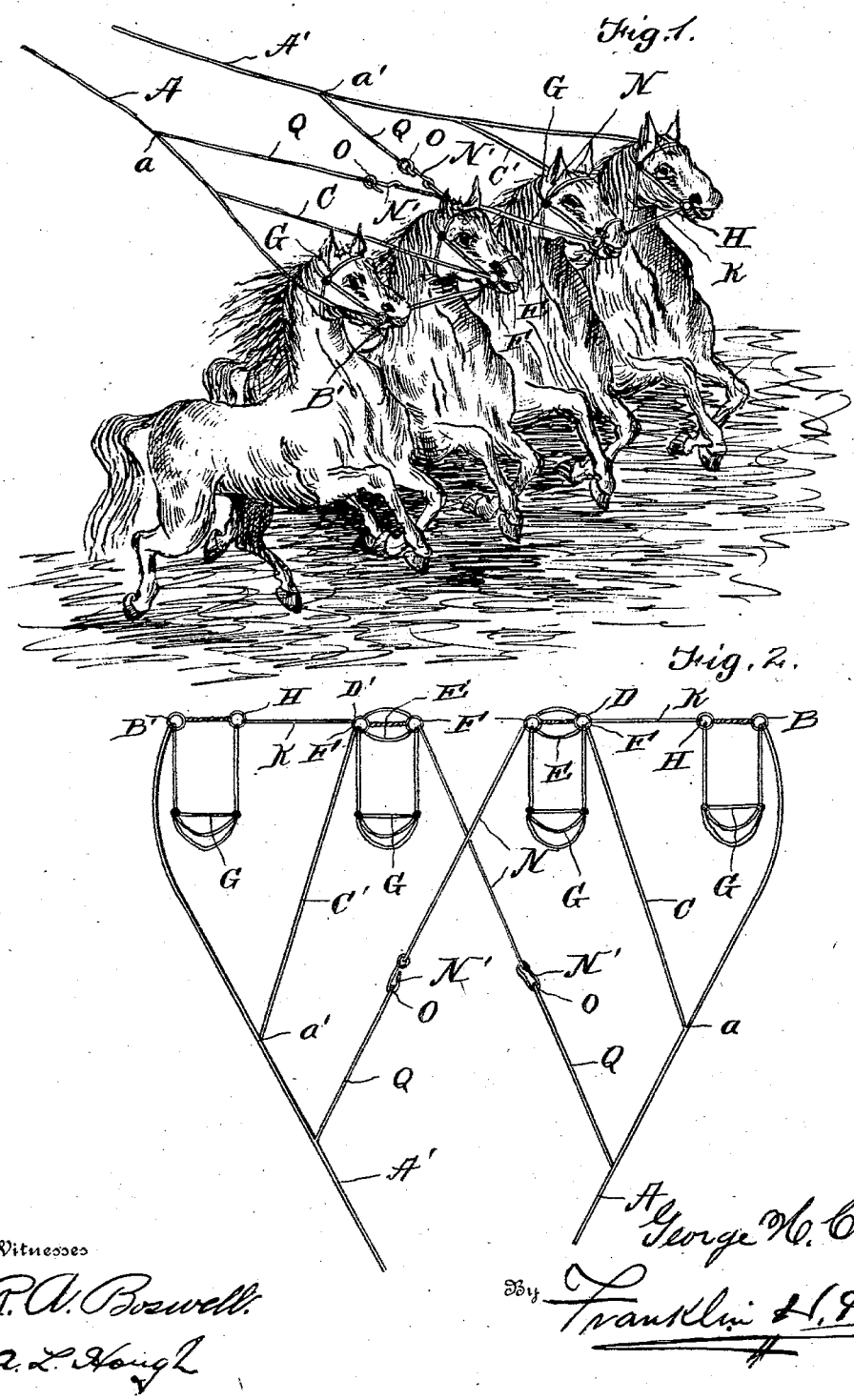

No. 757,598. Patented April 19, 1904.

UNITED STATES PATENT OFFICE.

GEORGE H. CARLIN, OF LEWISTOWN, ILLINOIS.

DRIVING-REINS.

SPECIFICATION forming part of Letters Patent No. 757,598, dated April 19, 1904.

Application filed December 19, 1903. Serial No. 185,881. (No model.)

*To all whom it may concern:*

Be it known that I, GEORGE H. CARLIN, a citizen of the United States, residing at Lewistown, in the county of Fulton and State of Illinois, have invented certain new and useful Improvements in Driving-Reins; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in driving-reins; and the object of the invention is to produce reins which will enable a person to drive and guide four horses abreast with but two lines and so arranged that when adjusted to the harness they may be taken apart without the driver's going between the horses and so adapted that the hitching may be done at the sides of the horses or in front or behind, and in the provision of a separate check upon each horse, so that the animal may move its head without disturbing the other horses.

The invention consists, further, in various details of construction and in combinations and arrangements of parts, which will be hereinafter fully described and then specifically defined in the appended claim.

My invention is illustrated in the accompanying drawings, which, with the letters of reference marked thereon, form a part of this application, and in which drawings—

Figure 1 is a perspective view showing my lines as applied to four horses abreast. Fig. 2 is a detail view of the rein apparatus by itself.

Reference now being had to the details of the drawings by letter, A and A' designate the driving-reins, which are of the ordinary style and connected at their forward ends to the bit-rings B and B' of the outside horses, and C and C' designate branching reins connected at *a* and *a'*, respectively, and to the bit-rings D and D' of the head-stalls for the two inside horses. Each of the head-stalls for the inside horses has a nose-band E, each of which is connected to the head-stall G, and said nose-bands are attached to bit-rings F, which are connected, respectively, to the ends of the branching reins C and C'. The inner bit-ring H upon each bridle for an outside horse has connected thereto a cross-check K, the inner end of which is connected to the bridle-ring upon the head-stall of one of the inside horses. To the inner bit-ring of the inside horses are attached the ends of the intersecting checks N, which carry snap-hooks N', designed to engage eyes O in the ends of the branching straps Q, which are secured to the driving-reins A and A'.

By the provision of the construction of reins described it will be observed that four horses abreast may be conveniently driven and guided, the head-stalls may be unchecked without the necessity of going between the horses, and the harness is so adapted that hitching may be done at the sides of the horses or in front or behind. By the provision of the separate checks the horses may move their heads without disturbing one another.

While I have shown a particular construction of driving-reins embodying the features of my invention, it will be understood that I may vary the construction of the same in certain details without departing from the spirit of the invention.

Having thus described my invention, what I claim as new, and desire to secure by Letters Patent, is—

Driving-reins for four horses abreast comprising in combination with nose-bands adapted to engage the heads of the inside horses, head-stalls and bits for the horses, bit-rings upon said bits, reins A and A' connected to the bit-rings of the outside head-stalls, branching reins C and C' connected respectively to the outer bit-rings of the two inside head-stalls, cross-checks connecting the bits of the inside head-stalls with the adjacent bit-rings of the end head-stalls, and intersecting checks secured at their forward ends to the rings carried by said nose-bands, snap-hooks secured to said intersecting checks, branching straps secured to the driving-reins, and eyes carried by said branching straps and connected to said hooks, as set forth.

In testimony whereof I hereunto affix my signature in presence of two witnesses.

GEORGE H. CARLIN.

Witnesses:
W. M. FIKE,
BUTLER FOUTS.